United States Patent [19]
Hasegawa et al.

[11] Patent Number: 5,766,383
[45] Date of Patent: Jun. 16, 1998

[54] PNEUMATIC TIRE

[75] Inventors: Hirotsugu Hasegawa, Kakogawa; Motoo Hayashi, Akashi, both of Japan

[73] Assignee: Sumitomo Rubber Industries, Ltd., Hyogo-ken, Japan

[21] Appl. No.: 395,902

[22] Filed: Feb. 28, 1995

[30] Foreign Application Priority Data

Mar. 8, 1994 [JP] Japan ..................... 6-065722
Feb. 10, 1995 [JP] Japan ..................... 7-046546

[51] Int. Cl.$^6$ .................................. B60C 101/00
[52] U.S. Cl. ........................................ 152/209 R
[58] Field of Search ............... 152/209 R, 209 D

[56] References Cited

U.S. PATENT DOCUMENTS

| | | | |
|---|---|---|---|
| D. 266,919 | 11/1982 | Bennett | D12/146 |
| 4,456,046 | 6/1984 | Miller | 152/209 R |
| 5,000,239 | 3/1991 | Brayer et al. | 152/454 |
| 5,213,641 | 5/1993 | Tsuda et al. | 152/209 R |
| 5,269,357 | 12/1993 | Killian | |
| 5,309,963 | 5/1994 | Kakumu et al. | 152/209 R |
| 5,309,965 | 5/1994 | Williams | 152/209 R |

FOREIGN PATENT DOCUMENTS

| | | | |
|---|---|---|---|
| 0175829 | 2/1986 | European Pat. Off. | |
| 375596 | 6/1990 | European Pat. Off. | 152/209 D |
| 0422571 | 4/1991 | European Pat. Off. | |
| 0456949 | 11/1991 | European Pat. Off. | |
| 0493063 | 1/1992 | European Pat. Off. | |
| 3522967 | 1/1987 | Germany | 152/209 R |
| 61608 | 3/1988 | Japan | 152/209 R |
| 106111 | 5/1988 | Japan | 152/209 D |
| 25006 | 2/1991 | Japan | 152/209 R |

*Primary Examiner*—Steven D. Maki

[57] ABSTRACT

A pneumatic tire with a low aspect ratio of 0.55 to 0.70 comprising a tread provided with four circumferential grooves disposed symmetrically about the tire equator plane to divide the tread into axially spaced five land portions, at least one of the five land portions having a set of lateral grooves crossing the land portion. A sea area ratio Ss/S of a total area Ss of grooves to a total area S of a tread surface is 0.20 to 0.27. A distance La from the tire equator plane to the inner groove edge of the inner circumferential groove among the four circumferential grooves is 0.090 to 0.125 times a tread width TW, and a distance Lb from the tire equator plane to the inner groove edge of the outer circumferential groove among the four circumferential grooves is 2.5 to 3.0 times the distance La.

6 Claims, 5 Drawing Sheets

PNEUMATIC TIRE

BACKGROUND OF THE INVENTION

The present invention relates to a pneumatic tire capable of effectively reducing the tire noise.

FIELD OF THE INVENTION

Low noise and quiet running of automobiles have been keenly demanded recently, and reduction of tire noise is also needed accordingly.

Generally, on the tread surface of tire, tread grooves comprising circumferential grooves and lateral grooves crossing them are formed for the purpose of providing with wet grip performance and the like. While improving the water escape effect, the tread grooves generate air column resonance and increase tire noise. The air column noise is a resonant vibration caused when the air passes through the air column formed between the tread grooves and the road surface. And the air column noise is one of the main sound sources of the noise about 1000 Hz which is very irritating to the ear.

Hitherto, to reduce this kind of air column resonance, it was attempted to decrease the groove area and groove volume of the tread grooves. Such casual decrease of groove area or volume not only fails to exhibit the decrease of air column resonance effectively, but also lowers the wet grip performance.

The inventor hence accumulated studies on air column resonance and wet grip performance. As a result it was found, especially in a low profile radial tire suited to high speed running having four circumferential grooves on the tread surface, that a large vibration is generated near the tire equator plane, and that this vibration induces air column resonance based on the circumferential grooves. In addition, it was found that induction of air column resonance by tire vibration can be effectively suppressed by increasing the distance of the inner circumferential groove among four circumferential grooves from the tire equator plane, and that the sound pressure derived from the air column resonance is effectively decreased by reducing the groove area of the circumferential grooves.

SUMMARY OF THE INVENTION

It is hence a primary object of the invention to present a pneumatic tire capable of effectively reducing the tire noise, by defining the distance of the inner circumferential groove from the tire equator plane, in a low profile tire having four circumferential grooves.

According to one aspect of the present invention, a pneumatic tire with a low aspect ratio of 0.55 to 0.70 comprising a tread provided with four circumferential grooves extending in the tire circumferential direction at symmetrical positions about the tire equator plane to divide the tread into axially spaced five land portions, at least one of the five land portions having a set of lateral grooves crossing said one of the five land portions to divide into a plurality of blocks, wherein a sea area ratio Ss/S of a total area Ss of grooves including said circumferential grooves and lateral grooves to a total area S of a tread surface is 0.20 to 0.27, each of distances La from the tire equator plane to inner groove edges of inner circumferential grooves at the inner side of the tire axial direction among said four circumferential grooves is 0.090 to 0.125 times a tread width TW, and each of distances Lb from the tire equator plane to inner groove edges of outer circumferential grooves at the outer side of the tire axial direction among said four circumferential grooves is 2.5 to 3.0 times the distance La.

The number of the lateral grooves in one set is preferred to be 90 to 110, and the set of the lateral grooves should be preferably arranged alternately of wide lateral grooves with a large groove width WA, and narrow lateral grooves with a narrow groove width WB being not larger than 0.8 times the groove width WA.

When a set of lateral grooves is provided in each land portion in at least one pair of adjoining land portions, a deviated amount $\alpha$ of axially confronting lateral grooves between one set and the other set is preferred to be 0.2 to 0.45 times the pitch length of lateral grooves.

The groove width K1 of the inner circumferential groove is preferred to be 1.5 to 2.0 times the groove width K2 of the outer circumferential groove, and sum of the groove widths K1, K1, K2, K2 is preferred to be 0.13 to 0.17 times the tread width TW.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

[Embodiment]

Figure 1:
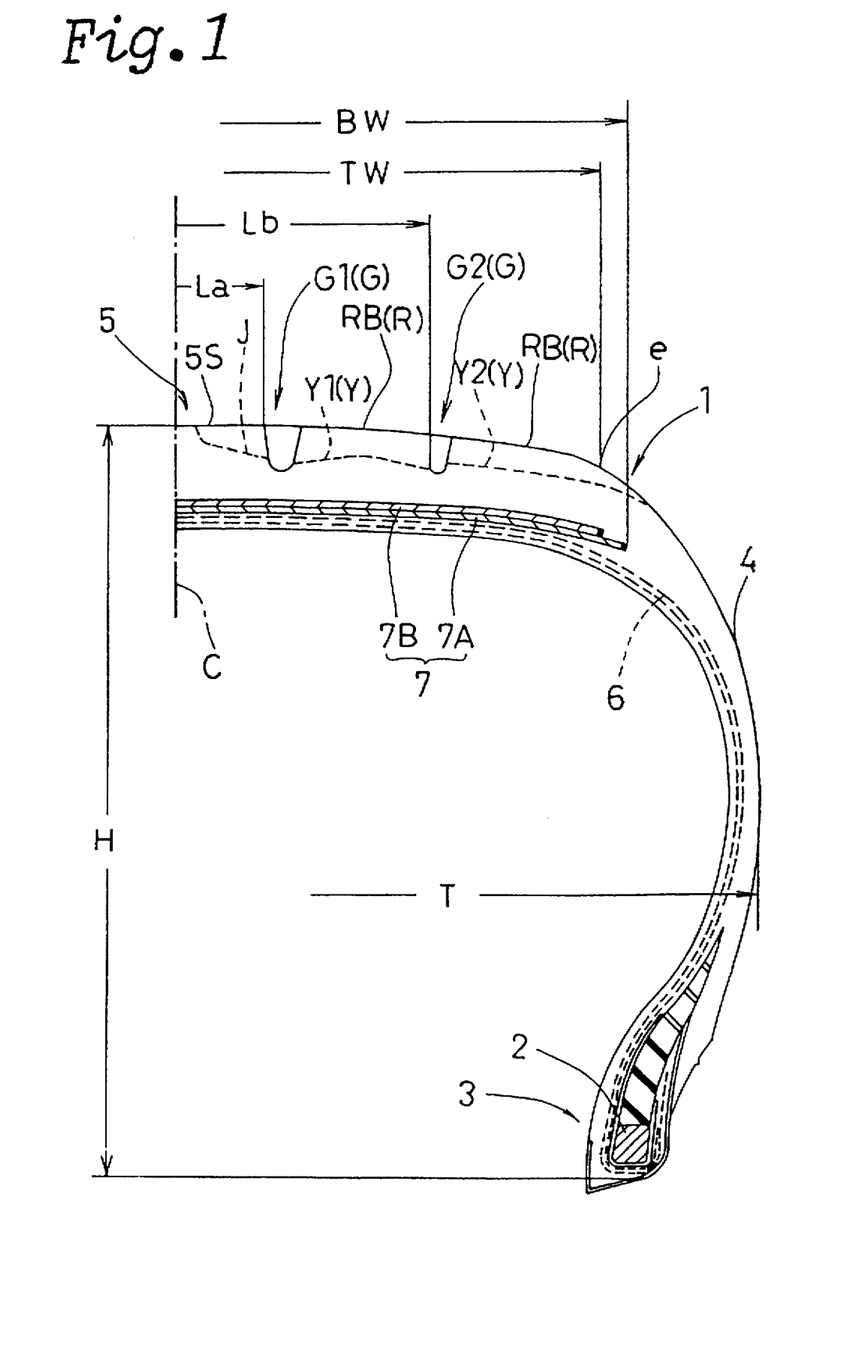
FIG. 1 is a sectional view of a tire showing an embodiment of the invention.

With reference to FIG. 1, a pneumatic tire 1 comprises a pair of beads 3 each having a bead core 2, side walls 4 extending from the bead 3 outwardly in the tire radial direction and a tread 5 linking the radially outer ends of the side walls 4.

The pneumatic tire 1 has the aspect rate H/T of the tire sectional height H to the tire maximum width T in a range of 0.55 to 0.70. A low-profile radial tire for passenger car in a tire size of 215/65R14 is formed in this embodiment.

A radial carcass 6 extends from the tread 5 through the side walls 4 and folded back from inside to outside around the bead core 2, and a belt layer 7 is provided above the carcass 6 and radially inwards of the tread 5.

The carcass 6 is composed of one or more carcass plies of cords, two in this embodiment comprising inner and outer plies. The carcass cords are arranged at an angle of 75 to 90 degrees to the tire equator C, and are made of organic fiber cords of nylon, rayon, polyester, etc.

The belt layer 7 is composed of one or more belt plies of cords, two in this embodiment comprising inner and outer plies 7A, 7B. The belt cords are arranged at an angle of 30 degrees or less, for example, 24 degrees to the tire equator C, and the plies 7A, 7B are overlaid by varying the direction so that the belt cords may cross between plies. The belt cords are steel or other metal cords, and the carcass 6 is tightened by its hoop effect with a large flatness, and the tread 5 is reinforced at the same time. The ply width of the inner belt ply 7A is wider than the outer belt ply 7B, and the maximum ply width, that is, the belt width BW is 0.95 to 1.05 times a tread width TW.

The tread width TW is the axially width of the tread surface 5S which comes in contact with the ground in the state, mounted on a regular rim, inflated with a regular internal pressure and applied with a normal load, wherein the regular rim is the rim officially approved for the tire by for example JATMA (Japan), TRA (USA), ETRTO (Europe) and the like; the regular internal pressure is the maximum air pressure for the tire officially specified in Air-pressure/Max.-loads Table by for example JATMA (Japan), TRA (USA), ETRTO (Europe) and the like; and the normal load is the maximum load for the tire officially specified in Air-pressure/Max.-loads Table by for example JATMA (Japan), TRA (USA), ETRTO (Europe) and the like.

In this embodiment, the ratio TW/T of the tread width TW to the tire maximum width T is raised to about 0.80 so as to erect the profile of the tire side, thereby reducing a drumming noise. The drumming noise is an inside sound of low frequency (40 to 80 Hz) generated in the compartment when running on a road surface having tiny waves or a cracked road surface.

Figure 2:
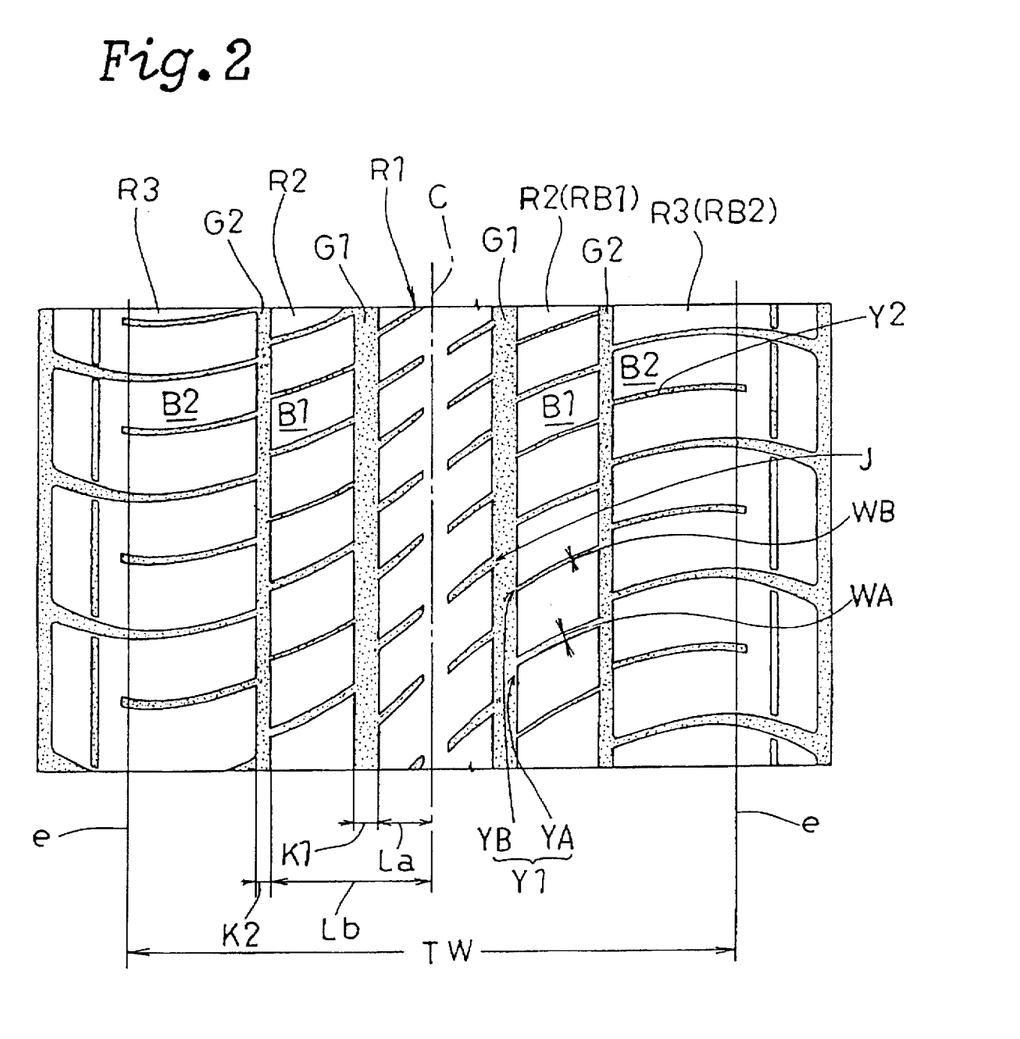
FIG. 2 is a plan view showing an example of its tread pattern.

The tread surface 5S is divided into axially spaced five land portions R by a total of four circumferential grooves G extending in the tire circumferential direction at symmetrical positions about the tire equatorial plane and tread edges e, and at least one of the five land portions is formed as a row RB of blocks.

The circumferential grooves G consist of two inner circumferential grooves G1 disposed inside in the tire axial direction, and two outer circumferential grooves G2 disposed at its axially outside. An inner land portion R1 extending on the tire equator C is formed between the inner circumferential grooves G1 and G1, two middle land portions R2 are formed between the inner and outer circumferential grooves G1 and G2, and two outer land portions R3 are formed between the outer circumferential groove G2 and the tread edge e.

The middle land portion R2 is provided with a set of lateral grooves Y1 crossing this middle land portion R2 to form a row RB1 of blocks B1. The outer land portion R3 is, also, provided with a set of lateral grooves Y2 crossing this outer land portion R3 to form a row RB2 of blocks B2. In the inner land portion R1, a set of terminated lateral grooves J having one end connecting with circumferential groove G1 and the other end being terminated in this inner land portion R1 is provided on each side of the inner land portion R1, thereby forming the inner land portion R1 as a rib form continuous in the circumferential direction. The terminated lateral groove J has a length of more than 25% of the width in the tire axial direction of the land portion R1 so as to have water discharge capability.

In the invention, one of the five land portions R can be formed in a row of blocks, but from the viewpoint of wet grip performance, it is desired to use two or, more preferably, four rows of blocks, and the inner land portion R1 is desired to be in a rib form for decreasing the tire vibration itself which may excite air column resonance and improve the straightforward stability.

A distance La between the inner groove edge in the tire axial direction of the inner circumferential groove G1 and the tire equator plane C is 0.090 to 0.125 times the tread width TW, and a distance Lb between the inner groove edge of the outer circumferential groove G2 and the tire equator plane C is 2.5 to 3.0 times the distance La. Thus, by setting the distance La at 0.090TW or more so as to keep the circumferential groove G1 away from the tire equatorial plane C, generation of air column resonance of circumferential groove G1 by tire vibration can be effectively suppressed. Meanwhile, when La is smaller than 0.090 TW, the air column resonance suppressing effect is inferior, and resistance to uneven wear is sacrificed, or when larger than 0.125TW, to the contrary, the wet grip performance is lowered.

When the distance Lb is smaller than 2.5 times the distance La, the balance of lateral rigidity of tread pattern is worsened, the cornering force is decreased, steering stability on dry road surface is lowered, and the noise increases due to the effect of tire vibration. If larger than 3.0 times, to the contrary, the rigidity of the outer land portion is extremely lowered, and uneven wear is induced.

The groove width K1 of the inner circumferential groove G1 is larger than the groove width K2 of the outer circumferential groove G2. That is, in order to have a uniform water discharge performance in the entire tread surface, it is necessary to relatively increase the water discharge capacity at the tire equator plane side, and hence the groove width ratio of the circumferential grooves K1/K2 is defined within 1.5 to 2.0 in this embodiment.

The sum $\Sigma K$ of the groove widths K1, K1, K2, K2 is 0.13 to 0.17 times the tread width TW, and by decreasing as compared with the ordinary tire having 0.2 times or more, the sea area ratio Ss/S of the total area Ss of the grooves comprising the circumferential grooves G, crossing lateral grooves Y and terminated lateral grooves J to the total area S of the tread surface 5S is defined within 0.20 to 0.27.

By thus decreasing the groove width K1, K2 of the circumferential grooves, the sound pressure itself attributable to the air column resonance can be reduced. Besides, by decreasing the groove width of lateral grooves, when the sea area ratio Ss/S is lowered, the noise reducing effect is hardly exhibited, while the water discharge performance is largely lowered.

In the embodiment, the number of the crossing lateral grooves arranged per one land portion R, that is, the number of crossing lateral grooves Y1, Y2 per one set is raised in a range of 90 to 110, respectively, and lowering of water discharge performance due too low sea area ratio Ss/S is prevented, and wet grip performance is maintained. Meanwhile, the number of crossing lateral grooves Y1 and the number of crossing lateral grooves Y2 may be different within the specified range (90 to 110), but it is preferred to form in the same number, as in the embodiment, from the viewpoint of uniformity, and the number of terminated lateral grooves J on one side is also in a range of 90 to 110, and coincides with the number of crossing lateral grooves Y1, Y2.

Incidentally, when the each number of the lateral grooves is in a range of 90 to 110, primary components of the pattern noise are concentrated at 800 to 1000 Hz, nearly coinciding with the frequency band of air column resonance derived from circumferential grooves, and the sound pressure is raised significantly, thereby increasing the noise.

To avoid such increase of noise, accordingly, the crossing lateral grooves Y arranged in the row RB of blocks are formed in two types of grooves differing in the groove width, and preferably they are arranged alternately in the tire circumferential direction.

Moreover, in at least one pair of land portions axially adjacent to each other, when the lateral grooves are provided on each land portion R in the pair, the lateral grooves axially confronting each other between the both side of the land portions should be preferably deviated in a specific range in the tire circumferential direction. Herein, the lateral grooves are common name for the crossing lateral grooves Y and terminated lateral grooves J.

That is, in the embodiment, among the sets of the lateral grooves Y1, Y2, the set of the lateral grooves Y1 disposed in the row RB1 of blocks are composed of two types, that is, wide lateral grooves YA with a wide groove width WA and narrow lateral grooves YB with a narrow groove width WB being not larger than 0.8 times the groove width WA, and the lateral grooves YA, YB are alternately arranged in the tire circumferential direction. By thus alternately arranging two types of lateral grooves differing in groove width, the apparent number of the lateral grooves YA, YB may be reduced to half of the initial number of 90 to 110, and the primary components of pattern noise generated depending on the number may be transferred to the low frequency band. Therefore, when the groove width WB is greater than 0.8 times the groove width WA, there is no effect of reducing the apparent number to half, and the peak sound of the air column resonance and pattern noise coincide with each other. Therefore, the groove width WB should be preferably 0.5 times or less of the groove width WA. To obtain a necessary water discharge capacity, the groove width WA is preferred to be in a range of 1.5 to 3.0 mm, and the groove width WB is desired to be in a range of 0.8 to 1.2 mm.

Figure 3:
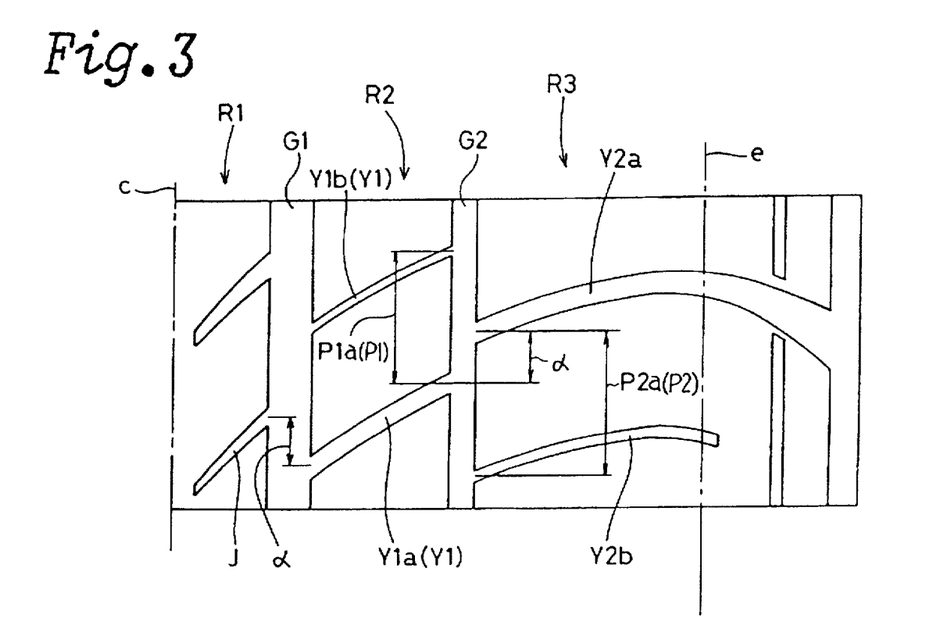
FIG. 3 is a plan view showing a magnified view of a part of the tread pattern.

A case of dislocating the mutually confronting lateral grooves in the tire circumferential direction is described below by referring to FIG. 3, representatively showing lateral grooves Y1, Y2 provided in the land portions R2, R3 axially adjacent to each other.

As shown in FIG. 3, the lateral grooves Y1, Y2 are opened in the circumferential groove G2 disposed between the land portions R2, R3. The opening center in the circumferential groove G2 of the lateral groove Y1a arranged at one land portion R2 is remote from the opening center of the lateral groove Y2a disposed at the other land portion R3 and confronting the lateral groove Y1a, by a deviated amount $\alpha$ in the tire circumferential direction. The deviated amount $\alpha$ is in a range 0.2 to 0.45 times of the pitch length P1a in the tire circumferential direction between the lateral groove Y1a and the lateral groove Y1b circumferentially adjoining to the lateral groove Y1a in the spacing direction. And the deviated amount $\alpha$ is similarly in a range of 0.2 to 0.45 times of the pitch length P2a in the tire circumferential direction between the lateral groove Y2a and the lateral groove Y2b circumferentially adjoining to the lateral groove Y2a in the spacing direction.

Herein, the lateral groove Y2a confronting the lateral groove Y1a refers to the lateral groove Y2a at the closer side to the lateral groove Y1a among the lateral grooves Y2a, Y2b enclosing this lateral groove Y1a. The relations $$0.2P1a \leq \alpha \leq 0.45P1a \quad (1)$$

$$0.2P2a \leq \alpha \leq 0.45P2a \quad (2)$$

should be satisfied in each one of the confronting lateral grooves. By thus deviating the confronting lateral grooves in a specific range in the tire circumferential direction, the frequency of pattern noise generated from each land portion is dispersed, and may be transformed into so-called white noise. Incidentally, if the deviated amount $\alpha$ is less than 0.2 times the pitch length P1 or P2, the dispersing effect is not enough, or if exceeding 0.45 to be close to 0.5 times, peak noise of double frequency of the peak frequency of the noise generated by the number of the lateral grooves occurs, and the noise performance is similarly impaired. Therefore, preferably, the deviated amount $\alpha$ is in a range of 0.25 to 0.40 times the pitch length. As far as satisfying the conditions (1) and (2), the pitch lengths L1, L2 may be changed according to the general pitch variation method, and the average pitch length at this time is about 18 to 24 mm.

More preferably, between the lateral grooves provided in the land portions R1, R2 axially adjacent to each other, that is, between the terminated grooves J and crossing lateral grooves Y1, a deviation in the tire circumferential direction satisfying the conditions (1) and (2) is formed similarly, and the noise relating to the lateral grooves is dispersed.

EXAMPLES

Trial tires in the structure as shown in FIG. 1, tread pattern as shown in FIG. 2 and FIG. 3, and tire size of 215/65 R15 91H were installed in on a passenger car (3.3 liters, FF vehicle) in on a regular rim (6 ½×15) and at regular internal pressure (front wheels: 2.1 kg/cm², rear wheels: 2.0 kg/cm²), and presented to tests 1 to 5 as specified below, and test results as shown in FIGS. 4 to 8 were obtained.

[Test 1]

Figure 4:
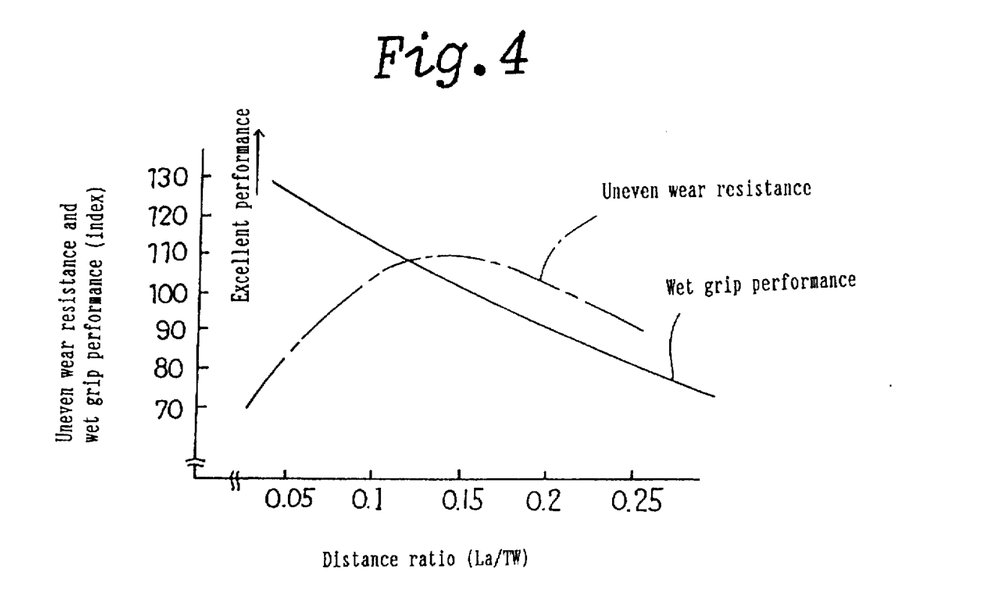
FIG. 4 is a diagram showing the relation of the ratio La/TW, wet grip performance, and uneven wear resistance performance.

The tread width TW (=164 mm) and ratio Lb/La (=2.80) were fixed, and the ratio La/TW of the distance La of inner circumferential grooves to the tread width TW was varied, and effects on resistance to uneven wear and wet grip performance were measured. The results are shown in FIG. 4.

[Test 2]

Figure 5:
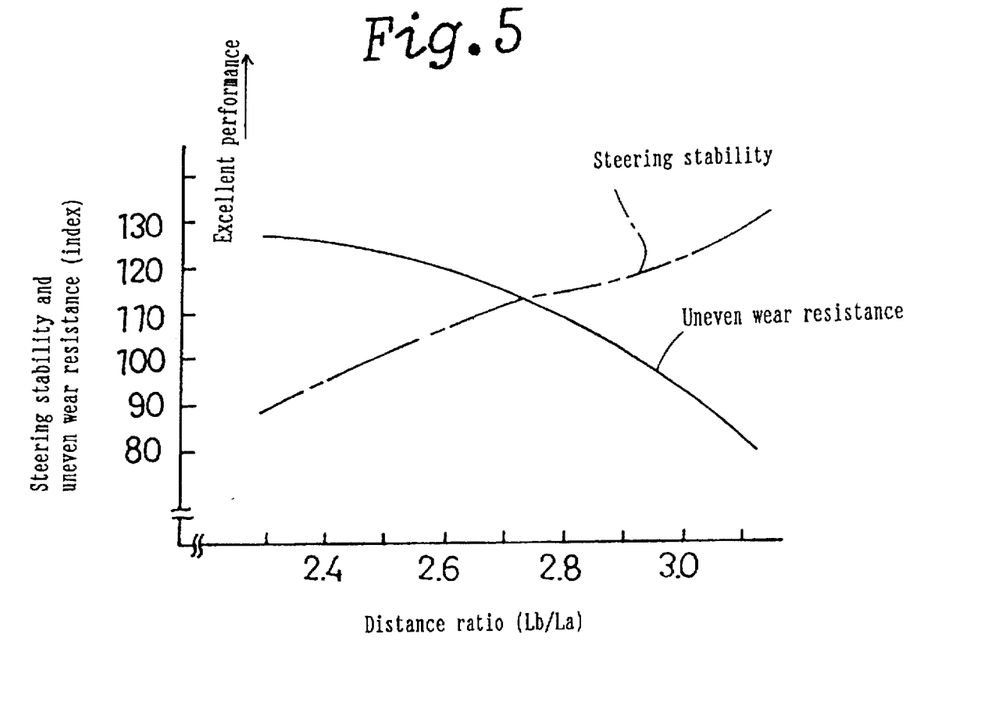
FIG. 5 is a diagram showing the relation of the ratio Lb/La, steering stability, and uneven wear resistance performance.

The tread width TW (=164 mm) and distance La of inner circumferential grooves (=16.4 mm) were fixed, and the distance Lb of outer circumferential grooves was varied, and effects on the ratio Lb/La, steering stability (dry road surface), and resistance to uneven wear were measured. The results are shown in FIG. 5.

[Test 3]

Figure 6:
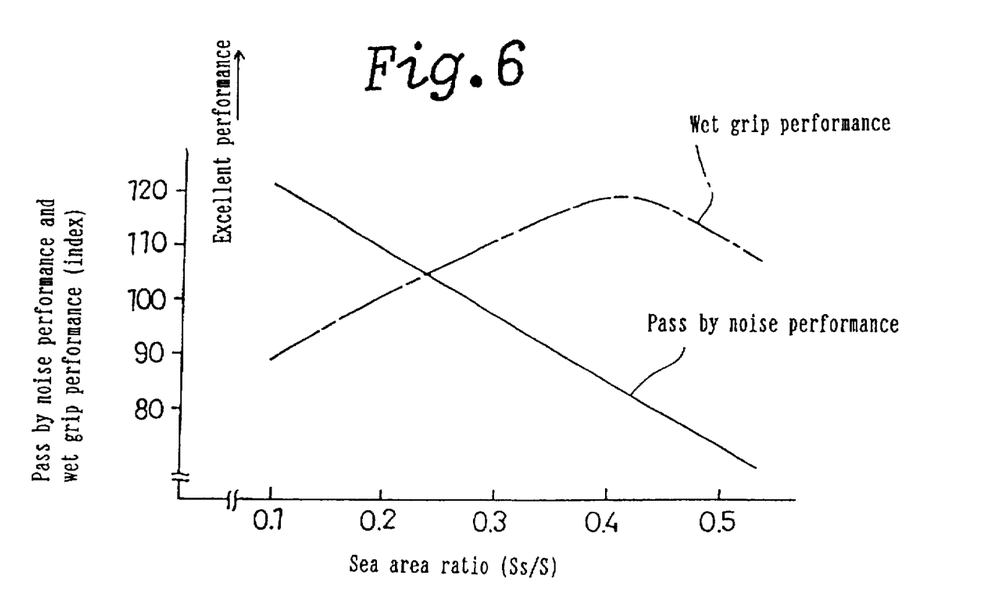
FIG. 6 is a diagram showing the relation of sea area ratio Ss/S, wet grip performance, and pass by noise performance.

Only the width of each circumferential groove was varied to change the sea area ratio Ss/S, and effects on pass-by-noise performance and wet grip performance were measured. The results are shown in FIG. 6.

[Test 4]

Figure 7:
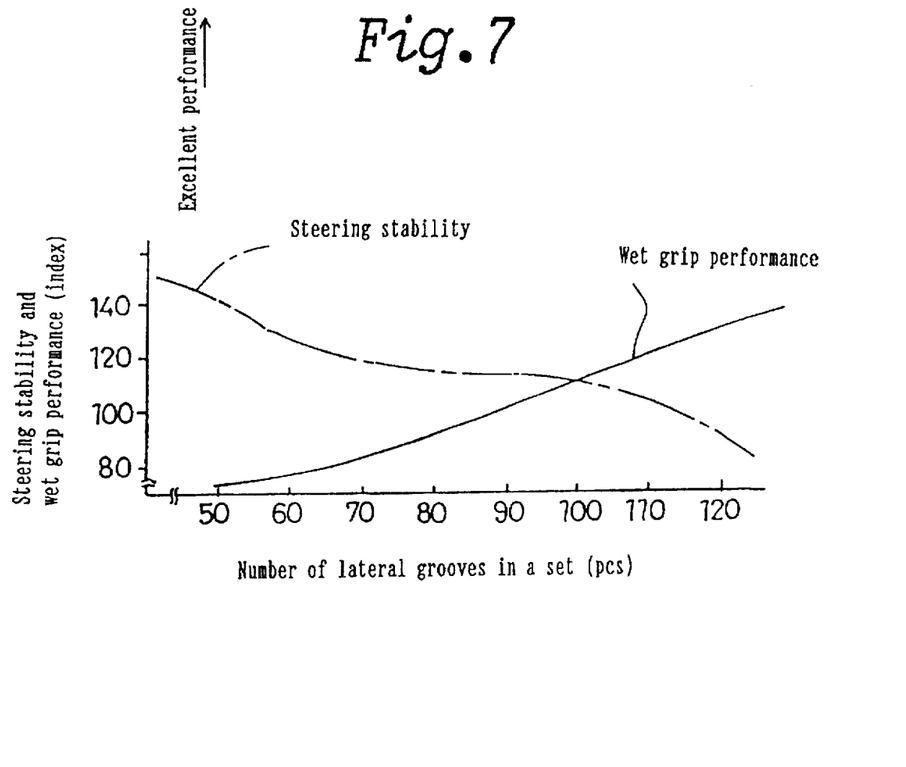
FIG. 7 is a diagram showing the relation of the number of lateral grooves, steering stability, and wet grip performance.

Only the number of lateral grooves was varied, and effects on steering stability and wet grip performance were measured. The results are shown in FIG. 7.

[Test 5]

Figure 8:
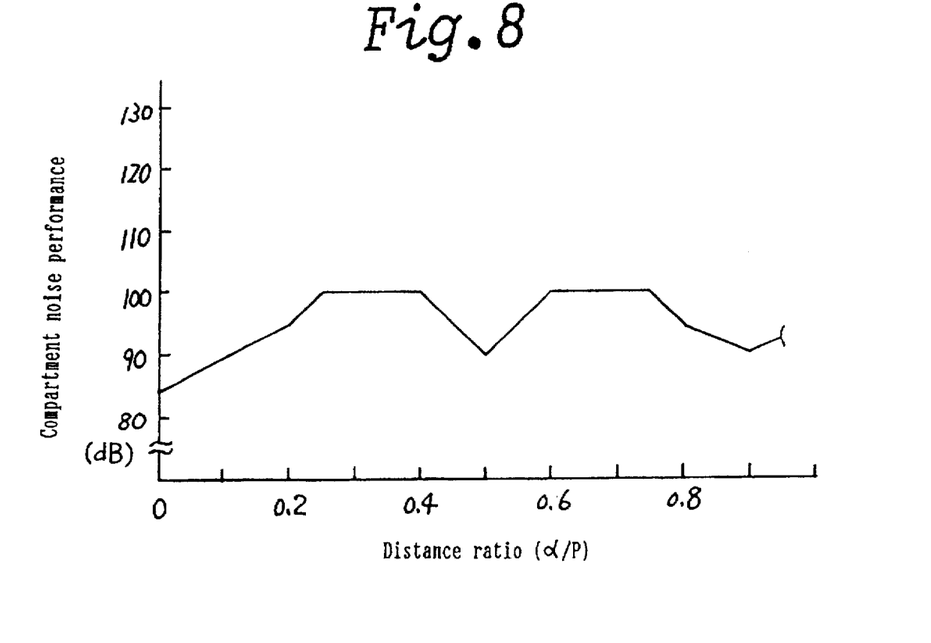
FIG. 8 is a diagram showing the relation between ratio $\alpha/P$ and compartment noise performance.

In the tire conforming to the specification of the embodiment in Table 1, the pitch length P of each lateral groove (=16 mm) was fixed, and effects of the ratio $\alpha/P$ of the deviated amount $\alpha$ to the pitch length P on the compartment noise performance were measured. The results are shown in FIG. 8.

In the pass-by-noise test, a microphone was set at a position remote by 7.5 m aside from the vehicle running in engine off state, and the noise was measured according to JISO Rule C-606.

In the wet grip test, in a course having a water pool of 5 mm in depth and 20 m in length on a road surface with a curvature of 100 m, the vehicle advanced while increasing the speed in steps, and the transverse acceleration (transverse G) was measured, and the mean transverse G at speed of 70 to 90 km/h was evaluated.

In the steering stability test (dry road surface), it was evaluated on the feeling of the driver by driving a dry paved course.

In the uneven wear resistance performance test, the appearance of wear of the tread surface was visually evaluated after the steering stability performance test.

In the compartment noise test, the compartment noise in steering stability performance test was evaluated by the feeling of the driver.

Besides, according to the specification in Table 1, trial tires were fabricated, and evaluated by the pass-by-noise test, wet grip test, steering stability test (dry road surface), uneven wear resistance performance test, and compartment noise test, and the performances being compared. Each performance is expressed by the index with that of the tire of the embodiment as 100, and the greater figure means the superior performance.

a sea area ratio Ss/S of a total area Ss of grooves including said circumferential grooves and lateral grooves to a total area S of a tread surface is in a range of 0.20 to 0.27, each of distances La from the tire equatorial plane to an axially inner groove edge of each of said pair of inner circumferential grooves is in a range of 0.090 to 0.125 times a tread width TW, and each of distances Lb from the tire equatorial plane to an axially inner groove edge of each of said pair of outer circumferential grooves is in a range of 2.5 to 3.0 times the distance La, wherein each of said pair of inner circumferential grooves has a groove width K1, each of said pair of outer circumferential grooves has a groove width K2, groove widths K1 are in a range of 1.5 to 2.0 times groove widths K2 and the sum of said groove widths K1, K1, K2, and K2 is 0.13 to 0.17 times the tread width TW.

2. The pneumatic tire of claim 1, wherein the number of the lateral grooves in said set of the lateral grooves is 90 to 110.

3. The pneumatic tire of claim 1, wherein said set of the lateral grooves comprise wide lateral grooves with a wide groove width WA and narrow lateral grooves with a groove width WB being not larger than 0.8 times the groove width WA, and the wide lateral grooves and narrow lateral grooves are arranged alternately.

4. The pneumatic tire of claim 1, wherein, in at least one pair of land portions axially adjacent to each other,

TABLE 1

|  |  | Embodiment 1 | Comparative example 1 | Comparative example 2 | Comparative example 3 | Comparative example 4 |
| --- | --- | --- | --- | --- | --- | --- |
| Tread pattern |  | FIG. 2 | FIG. 2 | FIG. 2 | FIG. 2 | FIG. 2 |
| Tread width | (mm) | 164 | 164 | 164 | 164 | 164 |
| Distance La | (mm) | 16.4 | 13.4 | 21.4 | 16.4 | 16.4 |
| Distance Lb | (mm) | 46.0 | 37.5 | 60.0 | 52.0 | 39.0 |
| Circumferential groove width K1 | (mm) | 7 | 7 | 7 | 7 | 7 |
| Circumferential groove width K2 | (mm) | 4 | 4 | 4 | 4 | 4 |
| Lateral groove width WA | (mm) | 3 | 3 | 3 | 3 | 3 |
| Lateral groove width WB | (mm) | 1.5 | 1.5 | 1.5 | 1.5 | 1.5 |
| Number of lateral grooves in the block row RB1 or BR2 |  | 100 | 100 | 100 | 100 | 100 |
| Ratio La/TW |  | 0.10 | 0.08 | 0.13 | 0.10 | 0.10 |
| Ratio Lb/La |  | 2.80 | 2.80 | 2.80 | 3.17 | 2.38 |
| Ratio K1/K2 |  | 1.75 | 1.75 | 1.75 | 1.75 | 1.75 |
| Ratio Ss/S |  | 0.25 | 0.25 | 0.25 | 0.25 | 0.25 |
| Ratio α/P between terminated lateral grooves J and crossing lateral groove Y1 | α/P | 0.34 | 0.34 | 0.34 | 0.34 | 0.34 |
| Ratio α/P between crossing lateral grooves Y1 and Y2 | α/P | 0.34 | 0.62 | 0.62 | 0.62 | 0.62 |
| Uneven wear resistance performance |  | 100 | 90 | 105 | 65 | 115 |
| Wet grip performance |  | 100 | 105 | 91 | 95 | 102 |
| Steering stability |  | 100 | 100 | 100 | 120 | 80 |
| Pass by niose performance |  | 100 | 92 | 102 | 102 | 95 |

What is claimed is:

1. A pneumatic tire with a low aspect ratio of 0.55 to 0.70 comprising a tread provided with a pair of inner circumferential grooves and a pair of outer circumferential grooves, said grooves extending in the tire circumferential direction at symmetrical positions about the tire equatorial plane to divide the tread into axially spaced five land portions, at least one of the five land portions having a set of lateral grooves crossing said one of the five land portions to divide thereunto into a plurality of blocks, wherein each land portion of said one pair is provided with said set of the lateral grooves crossing the land portion or a set of lateral grooves connecting with the circumferential groove between the land portions in said one pair and terminated in the land portion, the number of the lateral grooves of one set disposed in one land portion is same as the number of the lateral grooves of the other set disposed in the other land portion, said one set deviates in the tire circumferential direction to said the other set by a deviated amount α, and the deviated amount α between said one set and said other set is in a range of 0.2 to 0.45 times a pitch length P1 in the tire circumferential direction between the circumferentially adjacent lateral grooves in said one set, and in a range of 0.2 to 0.45 times a pitch length P2 in the tire circumferential direction between the circumferentially adjacent lateral grooves in said other set.

5. The pneumatic tire of claim 1, wherein, among the five land portions, a land portion on the tire equatorial plane is in the form of a continuous rib, and the other of said land portions are in the form of a row of blocks.

6. The pneumatic tire of claim 1, wherein the land portion between the pair of inner circumferential grooves is a rib continuously extending in the circumferential direction and having a set of lateral grooves of which one end connects with the one of the inner circumferential grooves and other end terminates therein, and each of the other four land portions has a set of lateral grooves crossing thereover to form a row of blocks therein.

* * * * *